(12) United States Patent
Cullen (10) Patent No.: US 7,594,374 B2
(45) Date of Patent: Sep. 29, 2009

(54) BAGGING MACHINES HAVING A COLLAPSIBLE TUNNEL

(75) Inventor: Steven R. Cullen, Astoria, OR (US)

(73) Assignee: S.R.C. Innovations, LLC, Chinook, WA (US)

( * ) Notice: Subject to any disclaimer, the term of this patent is extended or adjusted under 35 U.S.C. 154(b) by 0 days.

(21) Appl. No.: 11/313,073

(22) Filed: Dec. 19, 2005

(65) Prior Publication Data

US 2006/0096253 A1    May 11, 2006

Related U.S. Application Data (63) Continuation-in-part of application No. 11/022,043, filed on Dec. 22, 2004, now abandoned, which is a continuation-in-part of application No. 10/350,680, filed on Jan. 23, 2003, now Pat. No. 6,834,479, and a continuation-in-part of application No. 10/264,161, filed on Oct. 3, 2002, now Pat. No. 6,907,714.

(51) Int. Cl.
*B65B 1/24* (2006.01)

(52) U.S. Cl. .............................. 53/530; 53/567; 141/74

(58) Field of Classification Search .................. 53/527, 53/529, 530, 567, 570, 574, 576; 141/74
See application file for complete search history.

(56) References Cited

U.S. PATENT DOCUMENTS

| | | | |
|---|---|---|---|
| 3,638,394 A | 2/1972 | Winokur | |
| 3,687,061 A | 8/1972 | Eggenmuller et al. | |
| 3,968,619 A | 7/1976 | Fishburne | |
| 4,046,068 A | 9/1977 | Eggenmuller et al. | |
| 4,518,046 A | 5/1985 | Rettig et al. | |
| 5,113,956 A | 5/1992 | Friesen et al. | |
| 5,140,802 A | 8/1992 | Inman et al. | |
| 5,191,758 A | 3/1993 | Cote | |
| 5,205,107 A | 4/1993 | Herink | |
| 5,295,554 A | 3/1994 | Cullen | |
| 5,297,377 A | 3/1994 | Cullen | |
| 5,313,768 A | 5/1994 | Cullen | |
| 5,316,060 A | 5/1994 | Hodgdon et al. | |
| 5,345,744 A | 9/1994 | Cullen | |
| 5,355,659 A | 10/1994 | Cullen | |
| 5,367,860 A | 11/1994 | Cullen | |
| 5,396,753 A | 3/1995 | Cullen | |
| 5,398,736 A | 3/1995 | Cullen | |
| 5,408,809 A | 4/1995 | Cullen | |
| 5,408,810 A | 4/1995 | Cullen | |
| 5,419,102 A * | 5/1995 | Inman et al. | 53/567 |
| 5,421,142 A | 6/1995 | Cullen | |
| 5,425,220 A | 6/1995 | Cullen | |
| 5,426,910 A | 6/1995 | Cullen | |
| 5,452,562 A | 9/1995 | Cullen | |

(Continued)

*Primary Examiner*—Paul R Durand
(74) *Attorney, Agent, or Firm*—Peter K. Johnson (57) ABSTRACT

A bagging machine for bagging agricultural or compost material includes a tunnel adapted to be configured in at least two positions. The tunnel may be configured in an open position and in a closed position. The tunnel may include a first and a second tunnel member joined by a coupling assembly. The coupling assembly may allow the first and second tunnel members to move between the two or more positions. At least one third tunnel member may be provided to cover at least one opening between the first and second tunnel members.

3 Claims, 6 Drawing Sheets

U.S. PATENT DOCUMENTS

| | | |
|---|---|---|
| 5,463,849 A | 11/1995 | Cullen |
| 5,464,049 A | 11/1995 | Cullen |
| 5,488,996 A | 2/1996 | Barry et al. |
| 5,517,806 A | 5/1996 | Cullen |
| 5,671,594 A | 9/1997 | Cullen |
| 5,724,793 A | 3/1998 | Inman et al. |
| 5,775,069 A | 7/1998 | Cullen |
| 5,784,865 A | 7/1998 | Cullen |
| 5,799,472 A | 9/1998 | Cullen |
| 5,857,313 A | 1/1999 | Cullen |
| 5,894,713 A | 4/1999 | Cullen |
| 5,899,247 A | 5/1999 | Cullen |
| 5,904,031 A | 5/1999 | Cullen |
| 5,960,612 A | 10/1999 | Cullen |
| 6,009,692 A | 1/2000 | Cullen |
| 6,220,001 B1 | 4/2001 | Brodrecht |
| 6,550,967 B2 | 4/2003 | Hedaya |
| 6,708,742 B2 | 3/2004 | Weathers et al. |

* cited by examiner

BAGGING MACHINES HAVING A COLLAPSIBLE TUNNEL

CROSS-REFERENCES TO RELATED APPLICATIONS

This is a continuation-in-part application of U.S. patent application Ser. No. 11/022,043, filed on Dec. 22, 2004 now abandoned entitled "Bagging Machine with an Adjustable Tunnel" and naming Steven R. Cullen as the inventor, which application is a continuation-in-part application of Ser. No. 10/350,680 filed Jan. 23, 2003 and Ser. No. 10/264,161 filed Oct. 3, 2002, now U.S. Pat. Nos. 6,834,479 and 6,907,714. The entire disclosure of these applications and patents is incorporated herein by reference for all purposes.

FIELD OF THE INVENTION

This invention relates to a bagging machine for bagging organic and other materials such as silage, compost, grain, sawdust, dirt, sand, etc., in which the tunnel of the bagging machine is collapsible.

BACKGROUND OF THE INVENTION

Agricultural feed bagging machines have been employed for several years to pack or bag silage or the like into elongated plastic bags. In recent years, the bagging machines have also been used to pack or bag compost material and grain into the elongated plastic bags. Two of the earliest bagging machines are disclosed in U.S. Pat. Nos. 3,687,061 and 4,046,068, the complete disclosures of which are incorporated herein by reference for all purposes. In these bagging machines, silage or the like is supplied to the forward or intake end of the bagging machine and is fed to a rotor or other compression means, which conveys the silage into a tunnel on which the bag is positioned so that the bag is filled. As the material is packed into the closed bag and because the closed end of the bag is stationary, the back pressure created by the feed pressure of the rotor causes the machine to move forward and to release or deploy an additional length of the bag. The packing density of the material packed in the bag is determined and controlled by a number of factors including the rate at which the bagging machine moves forward and the rate at which the silage material is packed into the bag.

Over the past several years, bagging machines and their associated tunnels have dramatically increased in size to accommodate the end-users' desire to use larger diameter bags. Tunnels for use with the bagging machines are available in a variety of widths, some of which are sufficiently large to accommodate bags having a diameter of 12 feet, 14 feet, or more. The large width of the tunnel presents a problem when the bagging machine is being transported on public roads, which normally limit those widths to approximately 102 inches (8.5 feet). Such width restrictions greatly reduce the mobility of machines with larger tunnels. The large width of the tunnel also presents a problem when the machines and tunnels are being shipped from the manufacturer to the retailer, distributor, or end-user.

Collapsible tunnels being adjustable between an operating position and a collapsed position are shown and described in U.S. Pat. Nos. 6,907,714 and 6,834,479, the complete disclosures of which were previously incorporated herein by reference for all purposes. Some embodiments of collapsible tunnels include two or more tunnel members that are movable with relation to each other. In some configurations of such collapsible tunnels, the movement of the tunnel members introduces openings between the tunnel members. The openings in the tunnel may negatively affect the bagging operation in a number of ways.

SUMMARY OF THE INVENTION

A tunnel for use with a bagging machine is disclosed in the present application. The tunnel includes a first tunnel member having forward and rearward ends and a second tunnel member having forward and rearward ends. The forward ends of the first and second tunnel members may be operatively coupled in a fixed, spaced-apart relationship. The rearward end of at least one of the first and second tunnel members may be selectively movable toward and away from the other. The tunnel further may include a third tunnel member operatively associated with the first and second tunnel members. The third tunnel member may be adapted to at least substantially close one or more openings created by moving the first and second tunnel members away from each other, such as by moving the tunnel members into an open configuration.

DETAILED DESCRIPTION OF THE PREFERRED EMBODIMENTS

Figure 1:
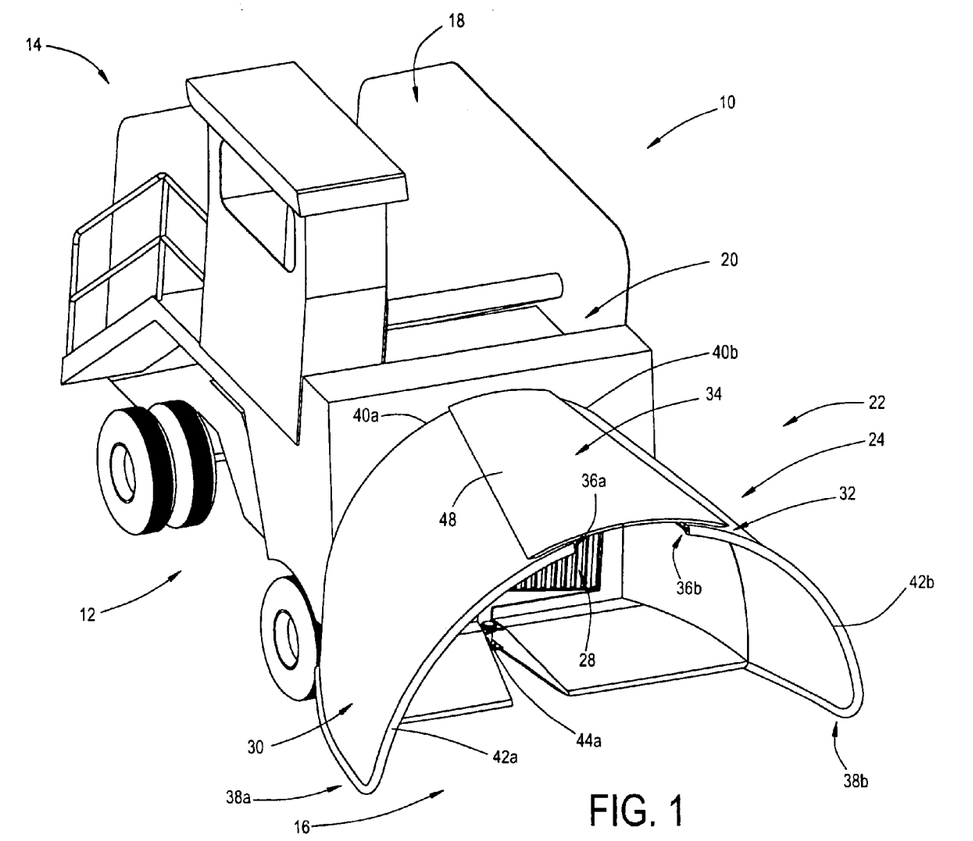
FIG. 1 is a perspective view of a bagging machine having a first and a second tunnel member according to the present disclosure.

In FIG. 1, a bagging machine is identified generally with the numeral 10. Bagging machine 10 is adapted to bag organic and other material such as silage, grain, sawdust, compost, garbage, sand, etc. within a bag. Bagging machine 10 may be configured for use with a conventional pre-folded bag, a bag that is folded as it is installed on the bagging machine such as described in U.S. patent application Ser. No. 10/350,973, or a bag that is formed from a roll of plastic material disposed on the bagging machine such as described in U.S. patent application Ser. No. 10/334,484. The entire disclosures of the above-mentioned patent applications are incorporated herein by reference for all purposes.

Machine 10 is illustrated as including a mobile frame 12. Mobile frame 12 may include wheels to facilitate movement and control and may also include an operator's cab, an engine, and other associated component parts. In some configurations, one or more of the illustrated components may be omitted or replaced. For example, the engine and operator's cab may be omitted and the mobile frame may be provided with a hitch to be pulled by a tractor or other equipment. Additionally or alternatively, the wheels and/or hitch may be omitted. Additionally, bagging machine 10 and associated frame 12 may be truck-mounted, such as seen in U.S. Pat. No. 5,784,865, or may be self-propelled, such as illustrated in U.S. Pat. No. 5,799,472. The complete disclosures of both of these patents are incorporated herein by reference for all purposes. The mobile frame 12 of the bagging machine 10 may include a number of suitable component parts to facilitate the operation of the bagging machine under a variety of conditions.

For purposes of description, bagging machine 10 will be described as having a forward end 14 and a rearward end 16. Machine 10 is provided with a material receiving assembly 18 at its forward end which may be in the form of: (1) a feed table such as seen in U.S. Pat. No. 5,297,377; (2) a hopper such as seen in U.S. Pat. No. 5,398,736; (3) a feed mechanism such as shown in U.S. Pat. No. 5,396,753; (4) a feed mechanism such as shown in U.S. Pat. No. 5,367,860; (5) a hopper such as seen in U.S. Pat. Nos. 5,140,802; 5,419,102; and 5,724,793; (6) a combination of one or more of the above; and/or (7) other suitable material receiving assemblies. The complete disclosures of the above-mentioned patents are incorporated herein by reference for all purposes. Material receiving assembly 18 is configured to receive the loose material to be bagged and to deliver the same to a material packing assembly 20, which may be positioned at the rearward end of the mobile frame 12. Material packing assembly 20 may include: (1) a rotor such as shown and described in U.S. Pat. Nos. 5,396,753; 5,297,377; 5,799,472; or 5,295,554; (2) a screw conveyor such as shown and described in U.S. Pat. Nos. 5,140,802 or 5,419,102; (3) a plunger such as shown and described in U.S. Pat. No. 5,724,793; (4) the packing fingers shown and described in U.S. Pat. No. 3,687,061; (5) a combination of one or more of the above; and/or (6) other suitable packing assemblies. The complete disclosures of the above-mentioned patents are incorporated herein by reference for all purposes.

While not required, bagging machines 10 according to the present disclosure also may include a density control assembly. A density control assembly as used herein refers to structures or devices that are coupled to the bagging machine and adapted to control or adjust the packing density of the material being packed into the bag. A variety of density control assemblies and methods may be implemented with the bagging machine of the present disclosure, some examples of which include backstop control systems, internal control systems, and drag resistance control systems.

In some bagging machines, a backstop structure engages the closed end of the bag and is yieldably coupled to the bagging machine to resist the movement of the bagging machine away from the filled end of the bag as silage is forced into the bag. These machines include a pair of drums rotatably mounted on the bagging machine with a brake associated therewith for braking or resisting the rotation of the drum with a selected brake force. A cable is wrapped around the drum and is connected to the backstop. Examples of such bagging machines are disclosed in U.S. Pat. Nos. 3,687,061 and 4,046, 068, previously incorporated by reference.

In other bagging machines, an internal density control assembly is positioned in the flow of the agricultural material being bagged. In some internal density control assemblies, one or more cables or chains may be disposed in the flow of the material being bagged. In some embodiments, one or more cables are employed in an arched, U-shaped, V-shaped, or other suitable configuration and the dimensions of the arch, such as the width between the legs thereof or the distance to which it extends behind the frame, are adjusted to vary the packing density. Additionally or alternatively, one or more cables are used with an anchor attached to the rearward portions thereof with the anchor being adjustable and/or the length of the cable being adjustable to control the packing density. Examples of these and other alternative configurations of internal density control assemblies are disclosed in U.S. Pat. Nos. 5,297,377; 5,425,220; 5,463,849; 5,464,049; 5,517,806; 5,671,594; 5,775,069; 5,671,594; 5,857,313; 6,443,194; 6,655,116; 6,694,711; and RE38,020, the complete disclosures of which are hereby incorporated by reference for all purposes.

Additionally or alternatively, drag resistance density control assemblies using belts or straps disposed between the bagged material and the ground may be used. In these embodiments, a drag member, such as one or more belts or straps, is attached to the bagging machine or the tunnel and extends rearwardly behind the bagging machine. The drag member is positioned between the bagged material and the ground and may be disposed inside the bag or outside the bag. The weight of the bagged material on the drag member slows the advance of the bagging machine and increases the packing density of the agricultural material in the bag. The packing density of the material in the bag may be established prior to beginning the bagging operation or may be adjusted as the bag is being filled. The packing density is established or adjusted, at least in part, by controlling the amount of drag member surface area disposed under the weight of the bagged material. Density control assemblies for agricultural bagging machines that include drag members are disclosed in U.S. Pat. No. 6,748,724 and U.S. patent application Ser. No. 10/867,593. The complete disclosures of the above-identified patent and patent application are hereby incorporated by reference for all purposes.

With continuing reference to FIG. 1, the bagging machine 10 includes a tunnel 22 coupled to the rearward end of the mobile frame 12. The tunnel 22 may be semi-circular, as shown in FIG. 1, or it may be square, rectangular, circular, oblong, or other suitable configurations. The tunnel 22 may be open at the bottom, as shown in FIG. 1, or may be at least partially closed at the bottom. As used herein, the term "tunnel" should be understood to signify a horizontal passageway at least partially open at both the forward end thereof and the rearward end thereof. The size of the tunnel, measured by either longitudinal length or cross-sectional area, at any particular time may be dependent on a number of factors including the diameter of the bag being filled, the type of material being bagged, the configuration of the tunnel such as semi-circular or circular, and whether bagging machine 10 is configured to be transported on a highway where machine width is a limiting factor. Various suitable tunnels and aspects of suitable tunnels are shown in U.S. Pat. Nos. 5,899,247; 5,396, 753; 5,297,377; 5,799,472; 5,398,736; 5,355,659; 5,295,554; 5,140,802; 5,419,102; 5,421,142; 5,724,793; 5,894,713; and the other patents referenced above, the entire disclosures of which are incorporated herein by reference for all purposes. Tunnels within the scope of the present disclosure may also be referred to herein as a material forming enclosure 24 when it includes two or more tunnel members.

A face plate 26 (best shown in FIG. 6) may be operatively secured to the frame of the machine 10 and to the tunnel 22. In some embodiments of the bagging machine, face plate 26 may be permanently mounted on the frame with tunnel 22 being removably coupled to the face plate. In other embodiments, face plate 26 may be part of tunnel 22 and the face plate may be removably coupled to frame 12. In other embodiments, face plate 26 may be omitted and tunnel 22 may be operatively coupled to frame 12, either permanently or removably. Face plate 26 may include an opening 28 through which the material passes from the material packing assembly 20 to the interior of tunnel 22. Throughout this disclosure, reference to tunnel 22 or tunnel members being coupled to frame 12 or to bagging machine 10 should be understood to refer to the tunnel or tunnel members being operatively coupled, removably or otherwise, to the faceplate, the frame, or another component of the bagging machine such that during operation of the bagging machine the tunnel is coupled to the frame for forward movement therewith.

As depicted in FIG. 1, tunnel 22 includes a first tunnel member 30, a second tunnel member 32, and a third tunnel member 34. The third tunnel member 34 will be described in greater detail below. First and second tunnel members 30, 32 may be curved as shown to form a semi-circular tunnel but may have other shapes to form tunnels of different configurations, as discussed above. While not necessary, the first and second tunnel members 30, 32 may be symmetrical and may be described as having inner regions 36a, 36b, outer regions 38a, 38b, forward ends 40a, 40b, and rearward ends 42a, 42b.

Figure 2:
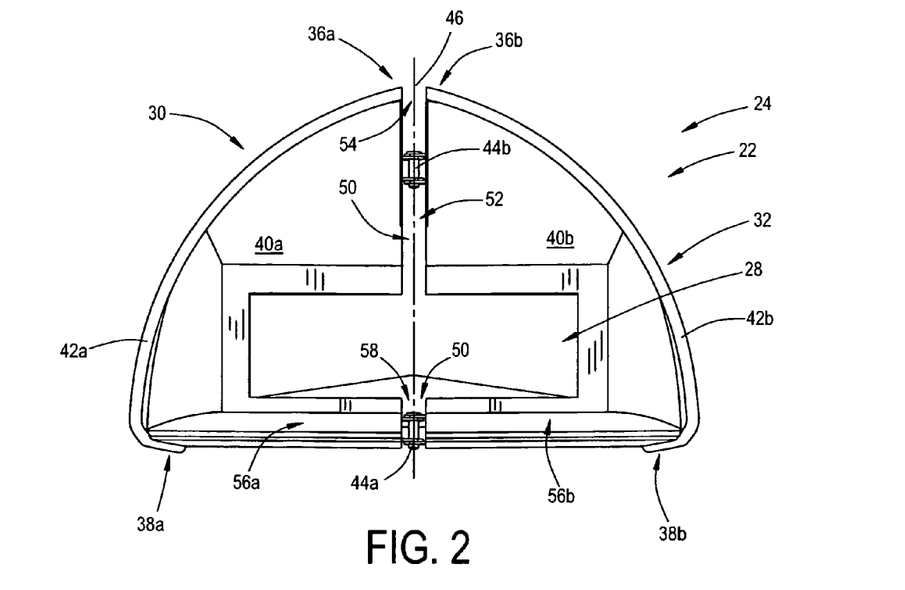
FIG. 2 is a perspective view of a tunnel according to the present disclosure illustrating the first and second tunnel members drawn together.
Figure 3:
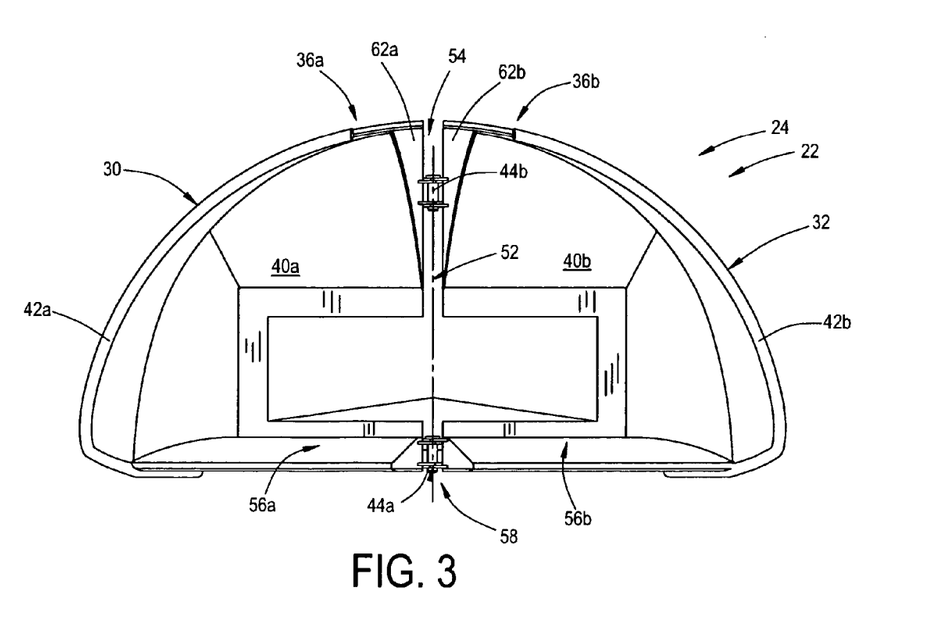
FIG. 3 is a perspective view of the tunnel of FIG. 2 illustrating the first and second tunnel members moved apart.

With reference to FIGS. 2 and 3, the tunnel 22 can be seen to have at least two functional configurations. Tunnel members 30, 32 may be selectively movable between a closed position, illustrated in FIG. 2, and an open position, illustrated in FIG. 3. As shown, forward ends 40a, 40b are hingedly coupled together, such that the movement of the rearward ends 42a, 42b is rotational movement about a single axis of rotation 46. One or more hinges 44a, 44b arranged vertically with a common axis of rotation may couple first and second tunnel members 30, 32. Alternatively, forward ends 40a, 40b may be coupled by two or more hinges having different axes of rotation to couple the forward ends. Whether there are one or more axes of rotation, the forward ends 40 are maintained in a fixed, spaced-apart relationship while one or more of the rearward ends 42 are movable relative to each other.

The first and second tunnel members 30, 32 may be moved between the open and closed positions manually. In the open configuration illustrated in FIG. 3, the forward ends 40a, 40b of the tunnel members engage the rearward side of faceplate 26, or the frame 12 when the faceplate is omitted. During operation of the bagging machine, the pressure of the packed material within the tunnel 22 presses the rearward ends 42a, 42b outwardly, which, in turn, may cause the forward ends 40a, 40b to press against face plate 26 or frame 12 to close the sides of tunnel 22. To configure tunnel 22 in the closed position, the rearward ends 42a, 42b may be manually drawn together and held in place through conventional means, such as straps, latches, or other coupling devices.

Additionally or alternatively, the bagging machine may be provided with a mechanical actuating assembly. An actuating assembly may be provided to selectively move the rearward ends of the first and second tunnel members toward one another and away from one another. The actuating assembly may include conventional devices for causing movement, such as a hydraulic cylinder, a gear rack, etc. For example, a hydraulic cylinder may be disposed between faceplate 26 and forward ends 40a, 40b, or some other part of the tunnel members, to cause the tunnel members to move between the open and closed position.

Bagging machine 10 also may include a coupling assembly to couple the first and second tunnel members in the desired open or closed configuration. The coupling assembly may include telescoping members, straps, cables or other structures configured to hold the tunnel members in the desired open or closed configuration. In some embodiments, the coupling assembly and the actuating assembly may be operatively associated with each other to cause the movement of the first and second tunnel members between the open and closed configurations. One example of operatively associated actuating assemblies and coupling assemblies is a hydraulic cylinder associated with two or more telescoping members.

When tunnel 22 is in the closed position, the width of bagging machine 10 and tunnel 22 is reduced to facilitate or enable transportation over the roadways and to facilitate shipping. The narrower width of tunnel 22 in its closed configuration may also facilitate installation of the bag to be filled.

First and second tunnel members 30, 32 may be formed of a rigid material such as steel or aluminum. In some embodiments, the first and second tunnel members may be manufactured from a single piece of material formed in the desired shape of the tunnel member. In other embodiments, the first and second tunnel members may include one or more perimeter members configured to define the perimeter of the first and second tunnel members. Additionally, the first and second tunnel members may include one or more support members in association with the one or more perimeter members. The support members may be configured to provide additional strength and integrity to the tunnel member shape defined by the perimeter members. Additionally, the support members may be configured to support a shell that may be used to form the tunnel members defined by the perimeter members.

When tunnel 22 includes a shell in cooperation with the perimeter members, the shell may be a single piece of material. Additionally or alternatively, the tunnel member may define multiple surfaces and the shell may include multiple pieces of material welded or otherwise joined together to form the tunnel member.

The materials of the first and second tunnel members 30, 32 may include rigid materials such as metals, plastics, and composite materials. Alternatively or additionally, the shells may include lightweight, flexible materials such as high-strength fabrics, reinforced fabrics, plastics, and the like. A high-strength fabric or other flexible material, whether used in shells of the first and second tunnel members or used in the third tunnel member, should be understood to refer to materials that are flexible but yet strong enough to not be permanently deformed or torn under the pressures that are typically applied to the tunnel members during a bagging operation. The configuration of the perimeter members and support members and the shell material may be selected such that the deformation of tunnel 22 is minimized during operation of the bagging machine.

As noted above, tunnel 22 may include a third tunnel member 34. Third tunnel member 34 may be provided in a number of configurations, one of which is illustrated in FIG. 1. As shown in FIG. 1, third tunnel member 34 includes a cover 48 extending from the forward end of the tunnel 22 to the rearward end of the tunnel. Cover 48 extends at least between the inner regions of the first and second tunnel members 30, 32 to close the space therebetween when the first and second tunnel members are separated. Similar third tunnel members having greater widths and being operatively coupled to the tunnel 22 in a variety of manners may also be implemented, such as described in U.S. patent application Ser. No. 11/022,043, previously incorporated by reference, and in U.S. patent application Ser. No. 11/020,646, filed on Dec. 22, 2004, naming Steven R. Cullen as the inventor, and entitled "Bagging Machine with a Tunnel at least Partially Formed of a Flexible Material," the entire disclosure of which is incorporated herein by reference for all purposes.

Turning now to FIGS. 2-7, an exemplary tunnel 22 is illustrated in a number of views and configurations. FIG. 2 illustrates tunnel 22 with the rearward ends 42 of the first and second tunnel members 30, 32 drawn together. Such a configuration may be considered to be a collapsed or closed configuration and may be a preferred configuration for transporting the tunnel and/or the bagging machine and may also be a preferred configuration for mounting a bag on the tunnel. Some tunnels within the scope of the present disclosure may be adapted to have a width less than about nine feet when in the collapsed configuration to facilitate transport and/or shipping. FIG. 3 illustrates the tunnel 22 with the rearward ends 42 moved apart, such as may be suitable during bagging operations. Some exemplary tunnels may be adapted to have a width of at least about twelve feet when in the open configuration with the rearward ends moved apart.

FIGS. 2 and 3 illustrate the tunnel 22 including the first and second tunnel members 30, 32 but omitting the third tunnel member of FIG. 1. Accordingly, FIGS. 2 and 3 reveal several places where the joint or coupling between the first and the second tunnel members 30, 32 may create at least one opening 50 in the tunnel 22. For example, there may be a vertical opening 52 at the forward end 40 of the tunnel 22 between the spaced apart forward ends of the first and second tunnel members. Additionally or alternatively, there may be a horizontal opening 54 between the inner regions 36 of the first and second tunnel members 30, 32.

The openings 50 disposed between the first and second tunnel members 30, 32 provide an exit path for the material being bagged and may be closed or covered to ensure that at least a substantial portion of the material entering the tunnel is directed rearwardly into the bag. Considering the open or operating configuration of FIG. 3, if material was allowed to exit through the vertical opening 52 or the horizontal opening 54, the material would not press against the packed material, would not propel the machine forward, and would not be packed into the bag.

FIG. 3 also illustrates forward tunnel supports 62, which will be described in more detail below.

Figure 4:
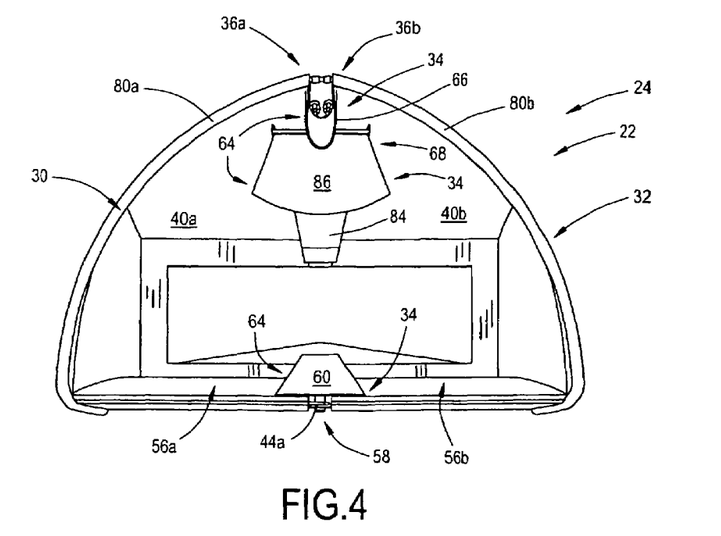
FIG. 4 is a perspective view of a bagging machine including a tunnel according to the present disclosure illustrating the first and second tunnel members drawn together and including at least one auxiliary tunnel member.

FIGS. 4-7 illustrate the tunnel 22 of FIGS. 2 and 3 including an auxiliary tunnel member 64. The auxiliary tunnel member 64 is another example of a third tunnel member 34 that may be used to cover an opening created by the separation between the first and second tunnel members 30, 32. As used herein, auxiliary tunnel member refers to a structure or combination of structures adapted to at least partially close an opening between the first and second tunnel members and to be disposed in at least two positions corresponding to the open configuration of the tunnel and the closed configuration of the tunnel 22. Accordingly, FIG. 4 illustrates auxiliary tunnel members 64 of at least three configurations: as floor cover members 60, as a flexible member 66, and as a tongue member 68, each of which will be described below. Additionally or alternatively, auxiliary tunnel members of other configurations may be provided to operatively associate with the first and/or second tunnel members to at least substantially close a portion of the opening between the first and second tunnel members.

Figure 5:
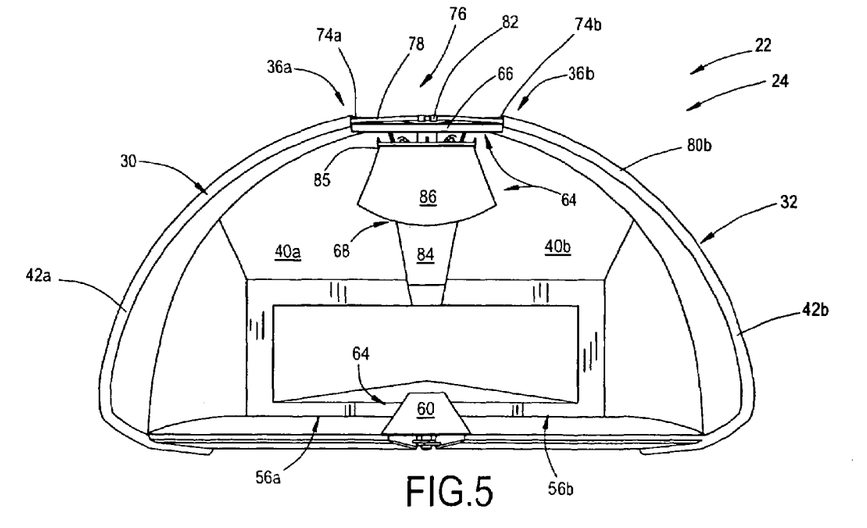
FIG. 5 is a perspective view of the bagging machine of FIG. 4 illustrating the first and second tunnel members moved apart.

With reference to FIGS. 2 and 3 and with continued reference to FIGS. 4 and 5, a floor assembly 56 may be provided in some bagging machines to guide the material as it exits the material packing assembly and enters the tunnel and bag. In some configurations of the tunnel 22, the floor assembly 56 may be provided as part of the tunnel or coupled to the tunnel. When the tunnel is provided by two or more tunnel members, the two or more tunnel members may include at least part of the floor assembly, such as first and second floor assembly portions 56a, 56b. In some configurations, the juncture between the floor assembly portions 56a, 56b may create additional openings 50, such as floor assembly opening 58 seen in FIG. 3. FIGS. 4 and 5 illustrate one example of an auxiliary tunnel member 64 adapted to cover the floor assembly opening 58 during bagging operations. As illustrated, a rearwardly extending floor cover member 60 is operatively coupled at the forward end of the tunnel 22 to the face plate 26 or the rearward end of the mobile frame 12. Floor cover member 60 may be formed of any suitable material and may be dimensioned to cover the floor assembly opening 58. The floor cover member 60 may be adapted to rest on the floor assembly 56 at the rearward end of the floor cover assembly. The floor cover member 60 may be adjustably coupled to the face plate or mobile frame, such as being hingedly coupled to rotate upward when the tunnel is collapsed. Additionally or alternatively, the floor cover member 60 may be fixedly coupled to the bagging machine so as to be disposed in a single position capable of covering the floor assembly opening 58 when the tunnel is in the open configuration.

Additionally or alternatively, the floor assembly opening 58 may be covered by floor cover members operatively coupled to the first and second tunnel members to move between an open configuration and a closed configuration. For example, each tunnel member 30, 32 may include a generally rearwardly extending floor cover member overlapping/underlapping the floor cover member of the other tunnel member. The distance to which the floor cover members extend rearwardly, their configuration, their positions relative to the floor assembly and the material packing assembly may each be varied to provide sufficient support to the floor assembly and floor cover members and to sufficiently close the floor assembly opening. The tunnels according to the present disclosure may be provided with other structures or modifications to cover, reduce, or eliminate the floor assembly opening.

Figure 6:
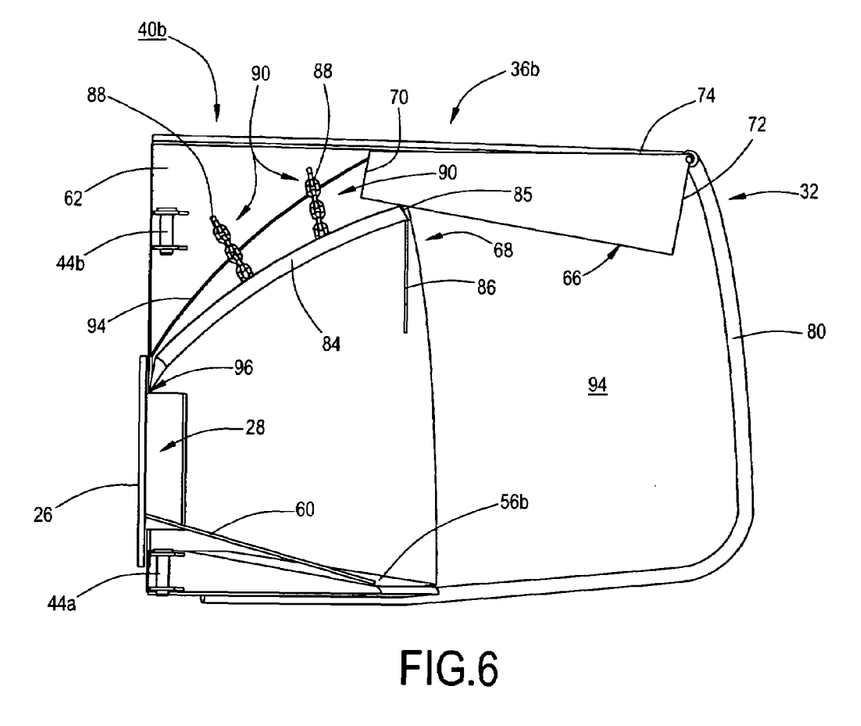
FIG. 6 is a cross-sectional view of the tunnel of FIG. 4.

With reference to FIGS. 4 and 5, an auxiliary tunnel member 64 in the form of a flexible member 66 is shown in a relaxed condition (FIG. 4) and in a taught condition (FIG. 5). While a single flexible member 64 is illustrated, one or more flexible members may be utilized in adjoining, overlapping, or other suitable relationship to at least substantially cover some or all of the openings 50 between the first and second tunnel members 30, 32. With reference to FIG. 6 and with continuing reference to FIGS. 4 and 5, the at least one flexible member may include a forward end 70 and a rearward end 72 as well as opposing side edges 74. Each of the side edges 74a, 74b may be operatively coupled to the corresponding first and second tunnel members adjacent to the inner regions 36a, 36b thereof in any suitable manner. For example, the side edges 74a, 74b may be coupled to the inner regions via bolts, screws, clamps, adhesives, or other joining methods. While the flexible member 66 may be coupled directly to the first and second tunnel members 30, 32, it may additionally or alternatively be coupled to other members disposed between the flexible member and the tunnel member, such as other forms of an auxiliary tunnel member or other coupling members.

The one or more flexible members 66 may include any suitable materials to provide it with the flexibility to not impede the movement of the first and second tunnel members together while additionally providing sufficient strength to resist breakage during bagging operations. In some configurations, one or more of the flexible members 66 may be adapted to stretch or elongate during bagging operations, such as to protect against breakage or to allow the tunnel 22 to attain its desired open configuration. The one or more flexible members 66 may be shaped or contoured in any suitable manner to allow proper coupling with the first and second tunnel members and to sufficiently cover the portion of the opening it is intended to cover. Moreover, reinforcing or strengthening members may be added to an otherwise less durable or weaker flexible material to impart the desired properties of flexibility and strength.

The forces on the tunnel members during bagging operations are high and the rearward ends 42 of the first and second tunnel members 30, 32 are pushed apart by these forces. In some configurations, the flexible members 66 may be sufficiently strong to couple the first and second tunnel members 30, 32 together during bagging operations. In other examples, a coupling assembly 76 may be provided between the first and second tunnel members 30, 32, as described briefly above. As best illustrated in FIG. 5, a cable 78 may extend between the rearward ends 42 of the first and second tunnel members, such as between the inner regions 36 thereof. The cable 78 may be coupled to the first and second tunnel members 30, 32 in any suitable manner. For example, the ends of the cable 78 may be welded, bolted, clamped, or otherwise coupled to the tunnel members. When both ends of the cable 78 are fixedly coupled adjacent to the inner regions of the tunnel members 30, 32, the cable 78 may be sufficiently flexible to enable the tunnel 22 to pivot and collapse as described herein.

Additionally or alternatively, the ends of the cable 78 may be adapted to extend within a tube disposed at the rearward end of the tunnel members 30, 32, such as within a tube adapted to provide a grader edge 80. In such configurations, the ends of the cable 78 may be provided with enlarged regions (not shown) adapted to slide within the grader edge 80 tubing but to be retained within the grader edge due to the smaller hole through which the cable exits the grader edge 80. The enlarged regions at the ends of the cable 78 may be provided in a number of suitable manners, such as by welding, bolting, clamping, or otherwise joining nuts, washers, lugs, or other suitable structures to the ends of the cables. Additionally or alternatively, the ends of the cable 78 may be operatively associated with coupling structures external to the grader edges 80 that allow sliding motion of one or more of the cable ends relative to the tunnel members 30, 32. For example, one end of the cable 78 may be fixedly coupled adjacent the inner region of the first tunnel member 30 while the other end may be slidingly associated with the inner region of the second tunnel member 32, either inside or outside the grader edge 80.

With reference to FIGS. 4 and 5, centering lugs 82 are illustrated in substantially the middle of the cable 78 that spans the separation between the first and second tunnel members 30, 32. The optional centering lugs 82 may be joined or coupled to the cable 78 in the manner described above regarding the enlarged regions at the ends of the cable or in other suitable manners. The centering lugs 82 may be adapted to encourage an equal amount of the cable 78 to be retracted or drawn into the grader edges of each of the tunnel members 30, 32, such as by being larger than the holes through which the cable enters the grader edge. Additionally or alternatively, the grader edge 80 may be provided with an interior wall or brace past which the cable cannot extend, which would also provide a means for centering the cable between the two tunnel members 30, 32 in the collapsed configuration. While a number of suitable configurations may be implemented to center the cable 78 during bagging operations or when the tunnel is in a collapsed configuration, the cable 78 also may be allowed to freely slide relative to the tunnel members when moving to the collapsed configuration, such that more or less of the cable may be retracted into or adjacent to one tunnel member or the other.

FIGS. 4 and 5 also illustrate a tongue member 68 disposed adjacent the forward end 40 of the tunnel 22. The tongue member 68 is yet another example of an auxiliary tunnel member 64 according to the present disclosure. With reference to FIGS. 2 and 3 and with continued reference to FIGS. 4 and 5, it can be seen that tongue member 68 is adapted to cover at least the vertical opening 52, described above, between the first and second tunnel members 30, 32. The tongue member 68 may be a single member or may include multiple members operatively coupled together to at least substantially cover or close a portion or all of the openings 50 between the first and second tunnel members. The tongue member 68 may be shaped in any suitable form to cover or at least substantially cover at least a portion of the openings 50 between the first and second tunnel members 30, 32.

Figure 10:
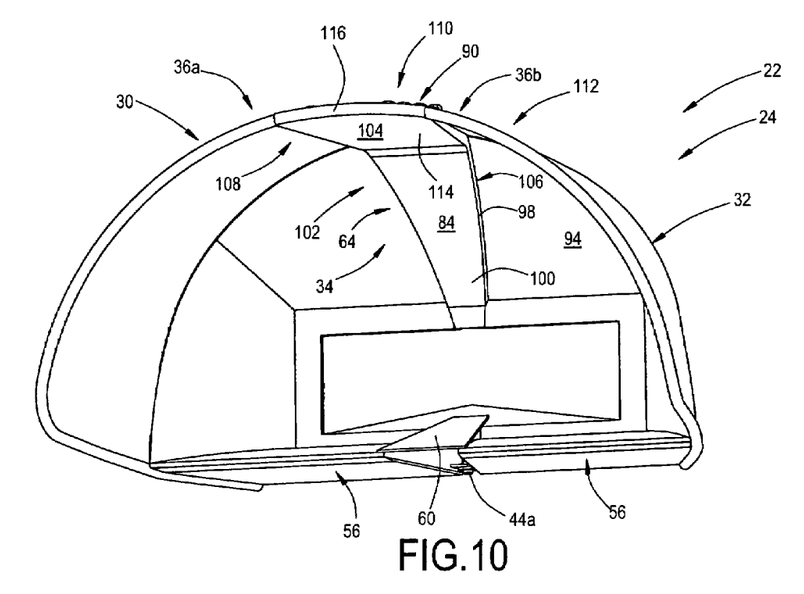
FIG. 10 is a perspective view of a tunnel according to the present disclosure illustrating the first and second tunnel members and an auxiliary tunnel member.

An exemplary tongue member 68 is more clearly illustrated in FIGS. 5-8. The tongue member 68 includes an elongate seal member 84 and a seal plate 86. As illustrated, the seal plate 86 is hingedly coupled to the seal member 84 adjacent to the top 85 of the elongate seal member 84; other suitable couplings may be utilized. Additionally or alternatively, the seal plate 86 may be fixedly coupled to the seal member 84 or may be coupled to the seal member 84 via one or more pieces of flexible materials, such as belting material. Similar to the tongue member 68, the exemplary component parts of the tongue member may be shaped in any suitable configuration. For example, the elliptical seal plate 86 may be circular, rectangular, square, or another suitable configuration. While a tongue member 68 including a seal member 84 and a seal plate 86, such as illustrated in FIGS. 5-8, adequately cover the forward vertical opening 52, other tongue members may be configured differently to cover or at least substantially cover the same or different openings. As one example, the tongue member may include two or more members operatively associated in telescoping relationship to widen and narrow as the tunnel members 30, 32 move apart and together. Another exemplary configuration where the tongue member is adapted to cover both the vertical opening 52 and the horizontal opening 54 is shown in FIG. 10 and described below.

Continuing with the exemplary configuration of the tongue member 68 including a seal member 84 and a seal plate 86, FIG. 6 illustrates a cross-sectional view of the tunnel 22 shown in FIG. 4, wherein the rearward ends of the first and second tunnel members 30, 32 are drawn together. FIG. 6 illustrates that the tongue member 68 may be adapted to be lowered into the tunnel 22 as the tunnel members 30, 32 are drawn together. As discussed above, the tongue member 68 may be configured in any suitable manner to move from one position during operation of the bagging machine to another position when the tunnel is collapsed, wherein the second position does not interfere with the collapsing of the tunnel. The configuration shown in FIG. 6 is one illustrative configuration; other suitable configurations are possible.

Figure 8:
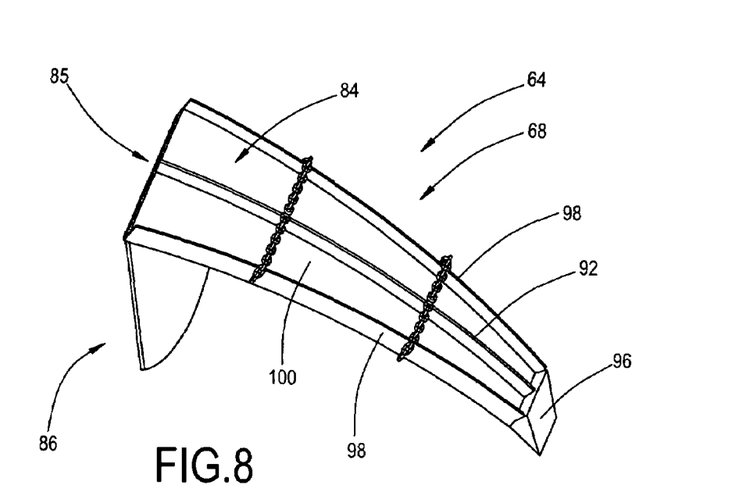
FIG. 8 is a perspective view of an auxiliary tunnel member according to the present disclosure.

As illustrated, the tongue member 68 is coupled to the second tunnel member 32 (and the first tunnel member 30, as well) via two chains 88 or other suitable coupling member 90. The coupling members 90 may be operatively coupled at one end to the tongue member 68 and at the other end to a suitable component of the tunnel member. As illustrated in FIG. 8, one end of coupling members 90 are coupled to the tongue member 68 along a center ridge 92 thereof. As illustrated in FIG. 6, the other end of the coupling members 90 are coupled to the forward tunnel supports 62. The number of coupling members used, the nature of the coupling members (chains, cables, ropes, etc.), the locations and parts to which the coupling members are attached, and the other relationships between the tunnel members and the tongue member may be varied to enable the auxiliary tunnel member to be moved out of the way when the first and the second tunnel members are moved together. For example, the tongue member may include multiple ridges, such as one for the coupling to the first tunnel member and one for the coupling to the second tunnel member. Other features and aspects of the tongue member may be varied as described herein.

As discussed above, the tongue member 68 is operatively coupled to the first and second tunnel members to be disposed in at least two positions. The coupling between the tongue member 68 and the first and second tunnel members 30, 32 may be adapted to move the tongue member between the two positions as the rearward ends of the tunnel members are moved apart and together. For example, the coupling members may be attached to portions of the first and second tunnel members that are moved apart from each other as the rearward ends of the tunnel members are moved apart, such that the coupling members pull the tongue member 68 upward as the tunnel members are moved apart. In the configuration illustrated in FIGS. 4-7, the coupling members are coupled to the forward tunnel supports 62. In other configurations, the coupling members may be attached to other parts of the tunnel members.

As seen in FIG. 6, some configurations of the tunnel 22 may define an interior tunnel surface 94 that is different from the exterior tunnel configuration. For example, the exterior of the forward end of the tunnel 22 may be substantially planar and vertical to mate with and operatively associate with the mobile frame. The interior surface 94 of the forward end of the tunnel 22 may curve or slope rearwardly. The forward tunnel supports 62 provide a structural framework to support the rearwardly extending forward interior surface 64 while also providing a mating surface with the mobile frame 12. Moreover, the forward tunnel supports 62 may also cooperate with the one or more hinges 44 to enable the hinges to rotate about a single axis of rotation while the interior surface of the forward end of the tunnel extends rearwardly, as illustrated in FIG. 6. Additionally, the rearwardly extending forward support members 62 provide a surface to which the coupling members 90 may be operatively joined. Due to the rearwardly extending nature of the forward support members, the more rearward portions move apart from each other as the tunnel members are moved apart. The separation between the forward support members may be adapted to move the tongue member between a first and a second position as the tunnel members are moved apart.

In exemplary configurations, the coupling members 90, the tunnel members 30, 32, and the tongue member 68 may be adapted to move the tongue member into a position to at least substantially close one or more openings between the first and second tunnel members simply by the movement of the rearward ends of the tunnel members apart from each other. In some embodiments, the tongue member 68 may be moved completely into the position illustrated in FIG. 7 wherein the tongue member 68 completely covers the separation between the tunnel members and is in contact with the interior surface 94 of the tunnel 22 to form a material forming enclosure 24 suitable for packing material into a bag. In other embodiments, the movement of the tunnel members may move the tongue member to a position that substantially covers the separation but is not in contact with the interior surface of the tunnel. In some embodiments, being moved close to the interior surface may be sufficient where the material being packed into the tunnel will push the tongue member 68 the remaining distance to contact the interior surface of the tunnel and close the opening between the first and second tunnel member. In other embodiments, the tongue member 68 may be moved close to the interior surface of the tunnel and may be further moved into position to seal the opening by an operator.

In the embodiment shown in FIGS. 4-7, the action of the coupling members between the tunnel members and the tongue member may be all that is necessary to hold the tongue member in position during bagging operations. In other embodiments, catches, braces, latches, or other mechanisms may be used to retain the tongue member in a desired position once the tunnel members are moved apart. Additionally or alternatively, braces, supports, catches, or other suitable mechanisms may be operatively, and optionally removably, coupled to the tunnel to support the tongue member in a desired position when the first and second tunnel members are moved together.

FIGS. 5 and 6 further illustrate that the tongue member 68 may be coupled to the tunnel 22 at the lower end of the tongue member. FIG. 6 illustrates that the lower end 96 of the tongue member is hingedly or adjustably coupled to the forward end 40 of the tunnel 22. The coupling at the lower end 96 may include a hinge or a flexible material forming a hinge or may be a loose connection to allow adjustability in the orientation and position of the tongue member 68. Additionally or alternatively, the lower end 96 may be coupled to the tunnel 22 in the manner of the remainder of the tongue member 68, such as by coupling members 90.

Figure 7:
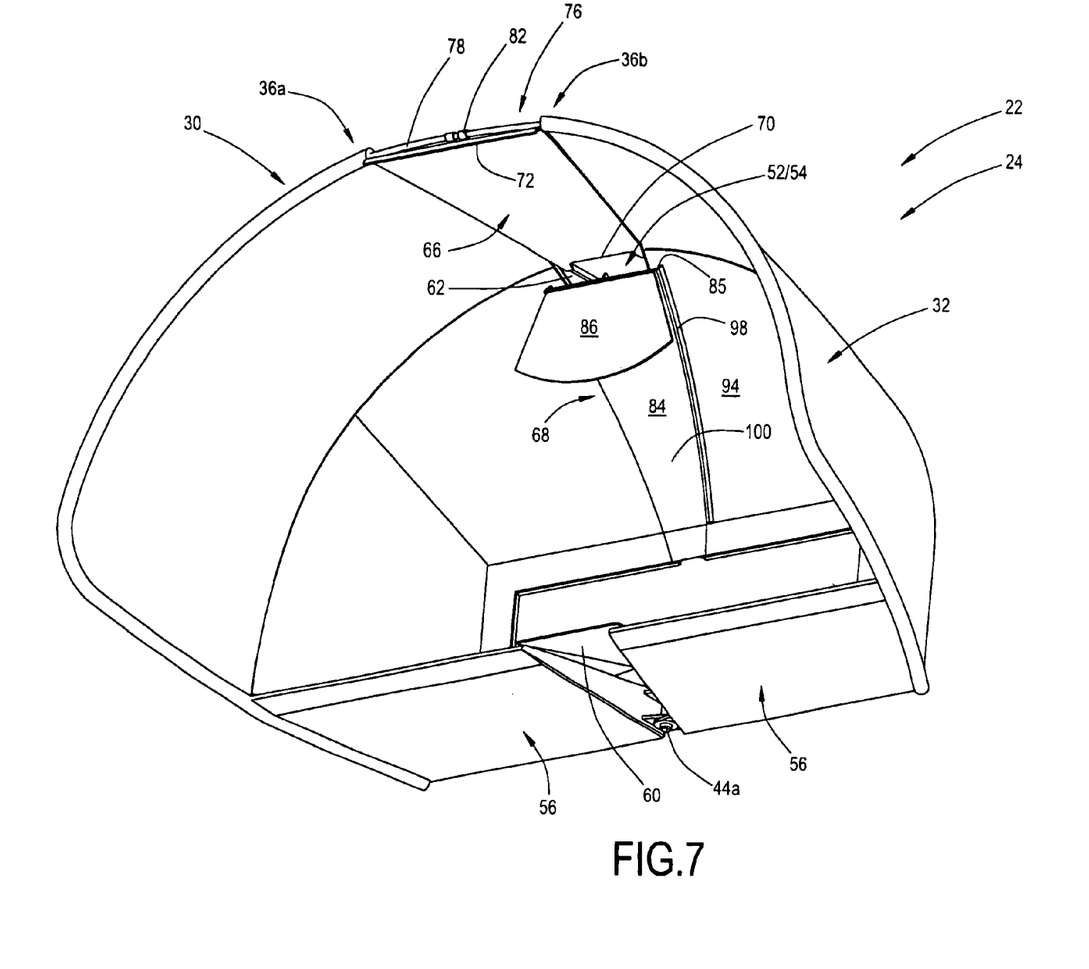
FIG. 7 is a perspective view of the tunnel of FIG. 5.

FIG. 7 illustrates a perspective view of the tongue member disposed in contact with the interior surface of the tunnel as described above. As illustrated, the tongue member 68 is curved to follow the contour of the interior surface 94 of the tunnel 22. Additionally or alternatively, tongue member 68 may not follow the contour of the tunnel member exactly but may include flange members 98 adapted to extend from the major surface 100 of the tongue member 68 to the interior surface 94 of the tunnel 22. Flange members 98 are also illustrated in FIG. 8. Additionally or alternatively, the major surface 100 may be adapted to press directly against the interior surface of the tunnel to substantially seal the opening between the tunnel members and the tongue member.

FIG. 7 further illustrates a tunnel configured with two auxiliary tunnel members 64, namely a flexible member 66 and a tongue member 68. In some embodiments, the tongue member 68 may be adapted to cooperate with the flexible member 66 to completely cover or close the openings 50 between the first and second tunnel members 30, 32. In other embodiments, there may be a gap remaining between the tongue member 68 and the flexible member 66. As illustrated, the remaining gap is between the flexible member 66 and the seal member 84. As discussed above and illustrated in FIGS. 7 and 8, tongue member 68 may include a seal plate 86 in addition to the seal member 84. The seal plate may be adapted to cover the gap or transition between the seal member and the flexible member. The seal plate 86 may be an extension of the seal member 84 at a different orientation or of a slightly different configuration to aid the transition between the seal member 84 and the flexible member 66. As illustrated, the seal plate is hingedly coupled to the seal member 84. The seal plate 86 in such a configuration is not drawn against the flexible material by the movement of the tunnel members. In the illustrated embodiment, the seal plate 86 is operatively coupled to the seal member 84 such that the material packed into the tunnel moves the seal plate against the flexible member, closing the remaining opening in the gap or transition between the seal member and the flexible member.

Figure 9:
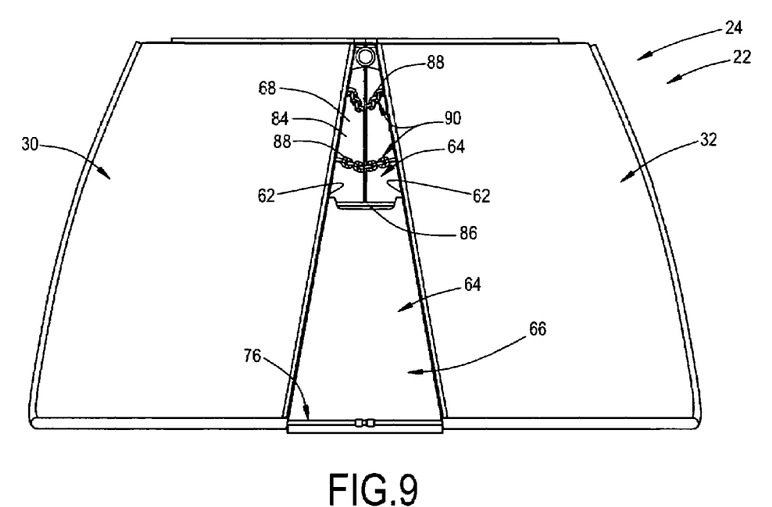
FIG. 9 is a perspective top view of the tunnel of FIG. 5.

FIG. 9 illustrates a top view of the tunnel 22 shown in FIG. 5 showing the relationship between the auxiliary tunnel members 64 and the first and second tunnel members 30, 32 when the tunnel is in its open configuration. FIG. 9 illustrates the coupling members 90, which are illustrated as chains 88, tensioned between the tongue member 68 and the forward tunnel supports 62 to hold the tongue member in position. As discussed above, the coupling members 90 may be varied to suitably couple the tongue member to the tunnel members. FIG. 9 further illustrates an exterior view of the flexible member 66 coupled to the first and second tunnel members and the coupling assembly 76 extending between the first and second tunnel members.

FIGS. 4-9 illustrate an exemplary configuration of a tunnel 22 that may be coupled to a bagging machine. While exemplary configurations of, and relationships between, the first and second tunnel members and the third tunnel members and/or auxiliary tunnel members have been described at length, one or more of the above components or features may be varied within the scope of the present disclosure. For example, several variations were described throughout including a tongue member of variable width rather than a tongue member that moves up and down within the tunnel. Moreover, tongue member 68 may include a number of flexible members interspersed between rigid members. For example, rigid members may be used to follow the contours of the tunnel around curves or sharp contours whereas flexible materials may be used in regions where the tunnel contour is substantially straight. Any suitable combination of members, whether they be tongue members, seal members, seal plates, or flexible members, may be incorporated into auxiliary tunnel members of the present disclosure.

FIG. 10 illustrates another exemplary configuration of the tunnel 22 according to the present disclosure. As illustrated, the tunnel 22 includes a third tunnel member 34 in the form of an auxiliary tunnel member 64 adapted to move between at least two positions when the rearward ends of the first and second tunnel members are moved apart and together. FIG. 10 illustrates one of the several variations of the tongue member 68 within the scope of the present disclosure wherein the auxiliary tunnel member 64 includes an extended tongue member 102.

The extended tongue member 102 may be similar to the tongue member 68 described above in that it includes a seal member 84 configured to cover or seal the opening between the first and second tunnel members 30, 32 at the forward end of the tunnel 22. Additionally, the extended tongue member 102 includes a top seal member 104 adapted to close or cover the opening at the top of the tunnel 22 between the first and the second tunnel members 30, 32. Top seal member 104 may be operatively coupled to the seal member 84 in any suitable manner. For example, the seal member 84 and the top seal member 104 may be flexibly coupled together via a flexible material or via a hinge or other suitable coupling. Additionally or alternatively, the seal member 84 and the top seal member 104 may be rigidly coupled together.

As illustrated, the extended tongue member 102 may be coupled to the first and second tunnel members 30, 32 in a manner similar to the tongue member 68. Chains, cables, braces, or other coupling members 90 may be attached to the extended tongue member 102 and the first and second tunnel members 30, 32. At the forward end 106 of the extended tongue member 102, the coupling members may be attached to the forward tunnel supports (not shown). At the rearward end 108 of the extended tongue member 102, the coupling members 90 may be attached to the exterior side 110 of the extended tongue member 102 and to the exterior side 112 of the first and second tunnel members 30, 32. Additionally or alternatively, the coupling members may be attached to the interior side 114 of the extended tongue member 102 and to the interior side 94 of the first and second tunnel members (not shown). The coupling between the extended tongue member 102 and the first and second tunnel members may be adapted to move the extended tongue member as described above. For example, the coupling members may be dimensioned to pull the extended tongue member 102 into position to at least substantially close the opening or separation between the first and second tunnel members. The number of coupling members 90 and their points of attachment to the extended tongue member 102 and the first and second tunnel members 30, 32 may be varied and selected to achieve the desired positions of the extended tongue member 102 when the tunnel 22 is in the open configuration and the collapsed configuration.

FIG. 10 further illustrates that extended tongue member 102 includes a grader edge 116 disposed at the rearward end 108 thereof. The grader edge 116 may be adapted to be disposed adjacent the grader edge 80 of the first and second tunnel members 30, 32 and together the grader edge 116 and the grader edge 80 may form a substantially continuous grader edge. Other features may be incorporated into the extended tongue member 102, the tongue member 68, or the other configurations of an auxiliary tunnel member within the scope of the present disclosure.

It is believed that the disclosure set forth above encompasses multiple distinct methods and/or apparatus with independent utility. While each of these methods and apparatus has been disclosed in its preferred form, the specific examples thereof as disclosed and illustrated herein are not to be considered in a limiting sense as numerous variations are possible. The subject matter of the disclosures includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring, nor excluding, two or more such elements.

It is believed that the following claims particularly point out certain combinations and subcombinations that correspond to disclosed examples and are novel and non-obvious. Other combinations and subcombinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

I claim:

1. A bagging machine for bagging agricultural, compost, or other material for storage or composting, the bagging machine comprising:
   a rotary packing apparatus adapted to move loose material into a material forming enclosure;
   a hooper adapted to receive loose material and direct the loose material to the rotary packing apparatus;
   a first tunnel member having forward and rearward ends;
   a second tunnel member having forward and rearward ends; and
   at least one auxiliary tunnel member operatively coupled to the first and second tunnel members and dispose therebetween; wherein the forward ends of the first and second tunnel members are operatively coupled in a fixed, spaced-apart relationship; wherein the rearward end of at least one of the first and second tunnel members is selectively movable toward and away from the other; and wherein the first tunnel member, the second tunnel member, and the at least one auxiliary tunnel member form the material forming enclosure when the rearward end of at least one of the first and second tunnel members is moved away from the other;

wherein the at least one auxiliary tunnel member is operatively coupled to the first and second tunnel members to at least substantially close at least one opening between the first and second tunnel members when the rearward end of at least one of the first and second tunnel members is moved away from the other;

wherein the at least one auxiliary tunnel member includes at least one flexible member and at least one tongue member; and wherein the at least one flexible member is disposed adjacent the rearward ends of the first and second tunnel members and extends forwardly for a distance less than a distance between the forward ends and the rearward ends of the first and second tunnel members leaving a portion of the opening unclosed.

2. The tunnel of claim 1, wherein the at least one tongue member is adapted to at least substantially close the portion of the opening left unclosed by the at least one flexible member.

3. The tunnel of claim 2, wherein the at least one tongue member includes at least one seal member and at least one seal plate operatively coupled to at least one seal member, wherein the at least one seal plate is adapted to at least substantially close any portions of the opening left unclosed by the at least one flexible member and the at least one seal member during bagging operations.

* * * * *